Oct. 27, 1970   P. MARCUS   3,535,742
MOLDING APPARATUS VALVE AND NOZZLE
Filed July 31, 1967   3 Sheets-Sheet 1

INVENTOR.
PAUL MARCUS
BY Brumbaugh, Free,
Graves & Donohue
his ATTORNEYS

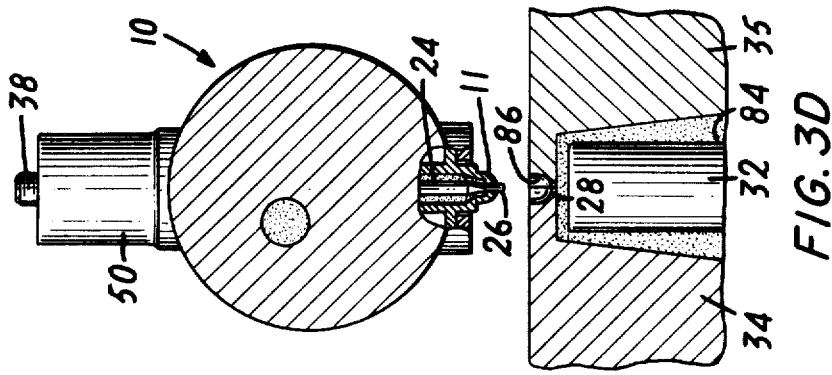
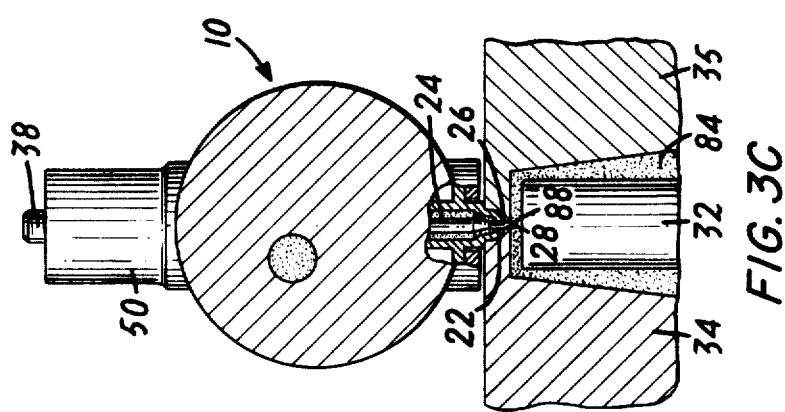
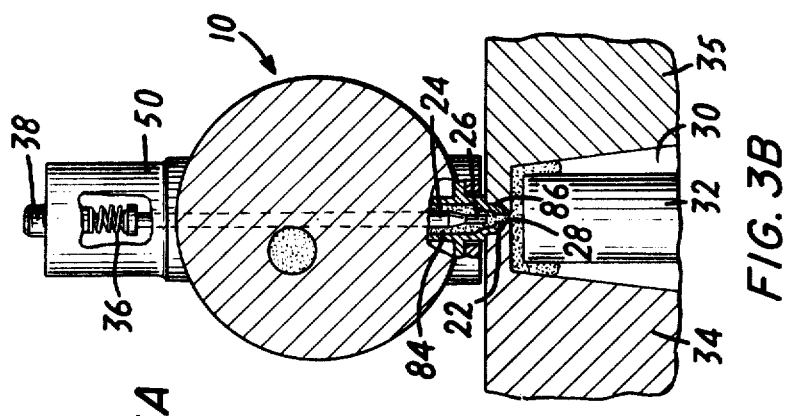
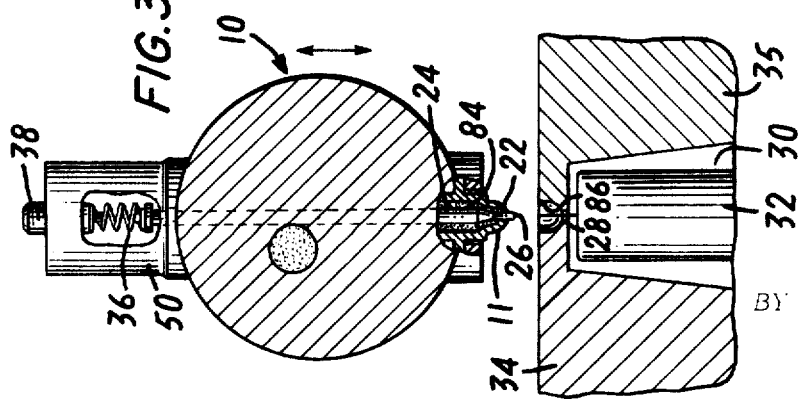

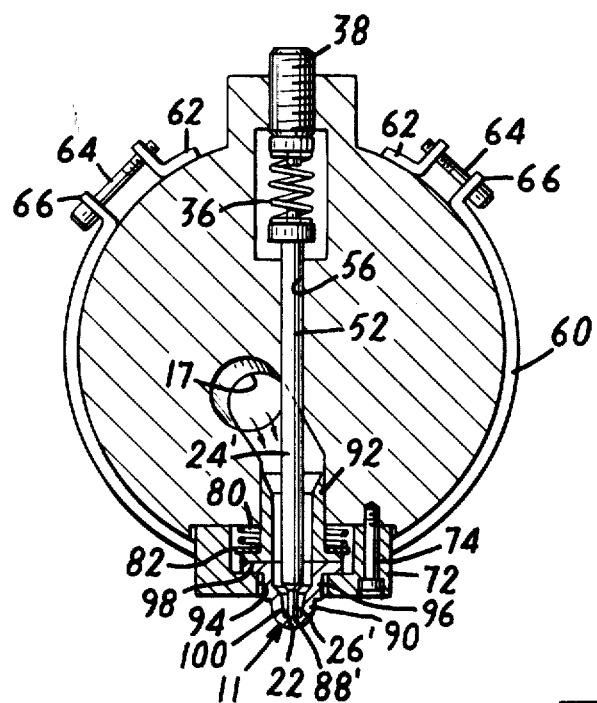
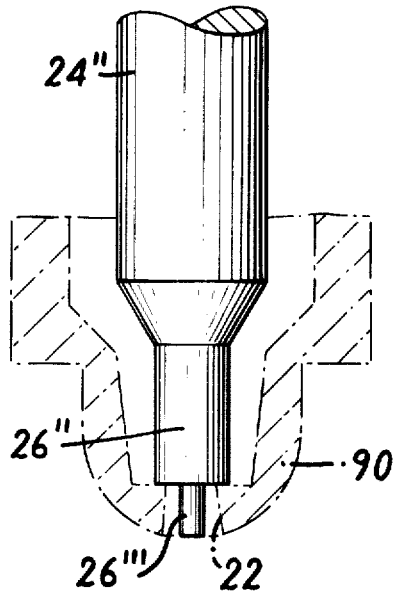
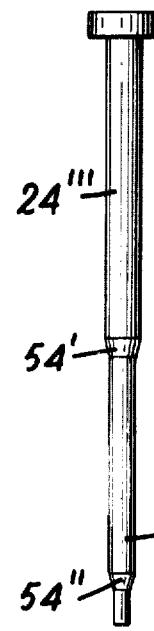

United States Patent Office 3,535,742
Patented Oct. 27, 1970

3,535,742
MOLDING APPARATUS VALVE AND NOZZLE
Paul Marcus, 85 Pascack Road,
Pearl River, N.Y. 10965
Filed July 31, 1967, Ser. No. 657,310
Int. Cl. B29f 1/05
U.S. Cl. 18—30  8 Claims

ABSTRACT OF THE DISCLOSURE

Valves controlling the flow of mold substance through nozzle gates into injection mold cavities are opened in a predetermined sequence in response to independently predetermined pressures of the mold substance. The valve members fill the nozzle and mold gates betwen successive injection cycles to prevent gate marks on the molded plastic articles and leakage of mold substance. Register of the nozzle gates with the mold gates is facilitated by structure permitting relative movement of the gates of one set of gates with respect to one another.

---

This invention relates to molding, more particularly, to novel and highly-effective apparatus for and runnerless injection molding.

It is often desirable, for reasons of efficiency and economy, to employ a mold-substance-distribution manifold having a multiplicity of nozzles for supplying molten or viscous plastic resin or other mold substance to a plurality of mold cavities, whereby a number of articles may be molded in a single operation.

A serious drawback to this practice and one which substantially interferes with the realization of the desired efficiency and economy is that the several nozzle gates through which the mold substance issues from the distribution manifold sometimes fail to effect satisfactory register with the respective mold gates through which the mold substance enters the mold cavities. One reason for such failure of register is of course inherent manufacturing tolerances. Another reason is that the various parts of the manifold and the structure forming the mold cavities are heated to varying degrees depending upon the nature of the mold substance and the nature of the articles to be manufactured. These factors vary from time to time, and the alignment of the nozzle gates and mold gates varies accordingly.

A further difficulty with conventional apparatus is its tendency to form gate marks on the molded articles, to leak plastic through the nozzle gates after the completion of the injection process, and to allow plastic to harden in the nozzle gates between successive injections.

Moreover, conventional apparatus typically fails to provide adequately for control of the sequence of the injection of the plastic into the respective mold cavities. Those skilled in the art understood that such control is desirable to facilitate uniform filling, in a single operation, of mold cavities of various sizes and shapes.

An object of the present invention is to overcome these and other disadvantages of conventional structure. In particular, an object of the invention is to provide structure facilitating automatic adjustment of the nozzle gates to bring them into register with the corresponding mold gates. Another object of the invention is to facilitate reduction or elimination of the space within the nozzle or mold gates which can be occupied by mold substance between successive injections, thus reducing the amount of leakage of mold substance and the tendency of the mold substance to plug the nozzle gates or the mold gates betwen successive injections. A further object of the invention is to provide means permitting the operation of the valves controlling the various nozzle gates in a predetermined sequence.

These and other objects of the invention are accomplished, in a representative embodiment thereof, by a runnerless multinozzle manifold in which the nozzles are constructed for relative movement with respect to the body portion of the manifold and adapted to be guided in such relative movement by the associated mold structure. The valves controlling the egress of mold substance through the respective nozzle gates are provided with valve mmebers which may be formed to fit, when the valves are closed, within the nozzle gates and, if desired, the mold gates, thus reducing or eliminating the space within those gates available for occupancy by the mold substance when the gates are closed. The valve members may be adjustably biased and of differential diameters so that they open simultaneously or in a predetermined sequence in response to the pressure of the mold substance in the manifold.

An understanding of further aspects of the invention may be gained from a consideration of the following detailed description of several representative embodiments thereof taken in conjunction with the accompanying figures of the drawing, in which.

Figure 2:
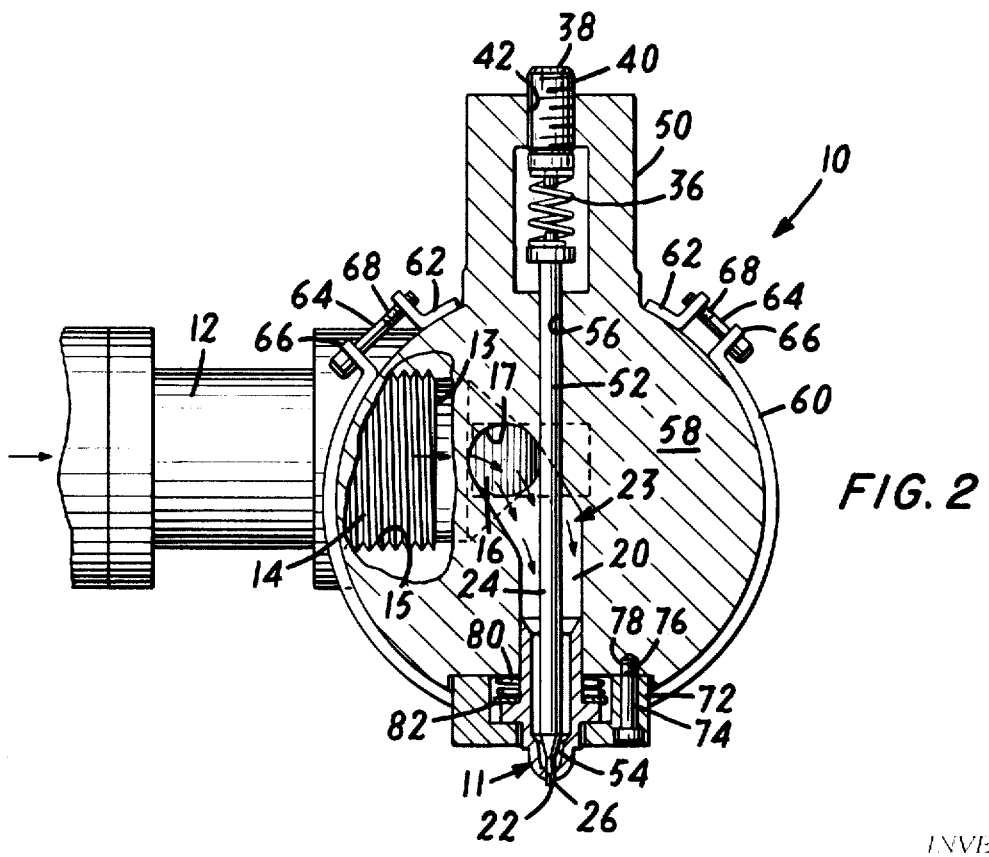
FIG. 2 is a view, on a scale larger than that of FIG. 1, taken substantially along the line 2—2 of FIG. 1 and looking in the direction of the arrows.

FIGS. 3A, 3B, 3C, and 3D are sectional views generally corresponding to FIG. 2, but on a scale smaller than FIG. 2, showing four successive steps in accordance with the invention;

FIG. 4 is a view generally corresponding to FIG. 2 showing an alternative embodiment of the invention;

FIG. 5 is a fragmentary elevation, partly in section, on a greatly enlarged scale, showing another embodiment of a portion of apparatus constructed in accordance with the invention; and FIG. 6 is a view in elevation, on a scale intermediate the scales of FIGS. 4 and 5, of another embodiment of a portion of apparatus constructed in accordance with the invention.

Figure 1:
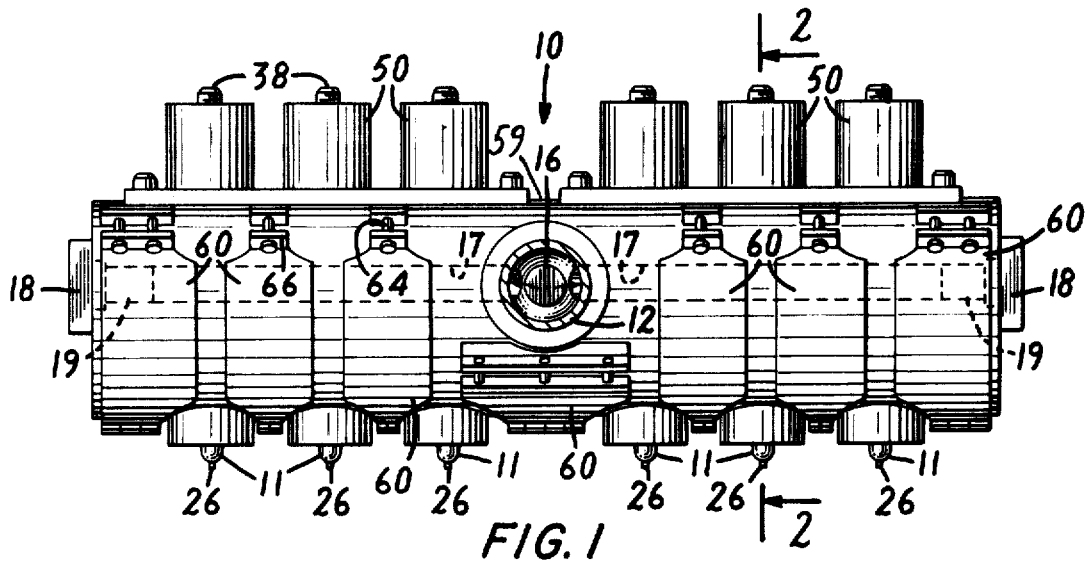
FIG. 1 is a plan view of apparatus constructed in accordance with the invention.

FIG. 1 shows a multinozzle manifold 10 constructed in accordance with the invention. The manifold 10 has a multiplicity of nozzles 11 for dispensing mold substance such as molten or viscous plastic resin into mold cavities (shown in FIGS. 3A, 3B, 3C, and 3D but not in FIG. 1) wherein the mold substance is molded to a desired shape. The mold substance is supplied to the manifold 10 from a plasticizing unit (not shown) such as an extruder through a pipe 12 (seen also in FIG. 2). The pipe 12 is formed adjacent to its end 13 with an externally threaded portion 14 screwed into a complementally and internally-threaded portion 15 in the manifold 10.

A stream of mold substance intermittently flowing (i.e., flowing during the process of injection, as will be explained below) in the pipe 12 is divided by baffle means 16 and flows intermittently through branching passages 17 in opposite directions for distribution to the nozzles 11. Plugs 18 screwed or otherwise removably inserted into opposite ends 19 of the branching passages 17 may be removed when necessary to facilitate cleaning of the interior of the branching passages 17.

The branching passages 17 communicate with nozzle passages 20 a representative example of which is shown in FIG. 2. The representative nozzle passages 20 shown in that figure communicates with a nozzle gate 22 forming an exit from the nozzle 11.

Valve means 23 having a valve pin or member 24 is provided for alternately opening and closing the nozzle gate 22. The valve member 24 is formed with a tip 26 complemental in cross-section to, and snugly slidable within the nozzle gate 22 and adapted when the valve member 24 is in its forward position (i.e., when the valve means 23 is closed) to protrude beyond the nozzle gate 22 as shown in FIGS. 1 and 2 a distance equal to the depth of a mold gate 28 (i.e., a distance equal to the extent of the mold gate 28 in the direction of movement therethrough of mold substance). See, for example, FIG. 3C, discussed in greater detail hereinafter. The tip 26 is also complemental in cross-section to, and snugly slidable within, the mold gate 28.

Thus, when the valve means 23 is in its closed position and the manifold 10 is in the position it assumes during the injection of mold substance into the respective mold cavities, the tip 26 substantially fully occupies both the nozzle gate 22 and the mold gate 28 and prevents occupancy of either of those gates by the mold substance. FIG. 3A, discussed in greater detail hereinafter, shows a representative mold cavity 30 for receiving and molding the mold structure. The mold cavity 30 is formed between a core member 32 and outer separable mold sections 34 and 35. The outer mold sections 34 and 35 need not, of course, be separable but may be formed as an integral structure.

The valve member 24 is urged forwardly to the closed position shown in FIG. 2 by biasing means such as a spring 36. The force with which the spring 36 urges the valve member 24 to its forward or closed position is a function of its adjustment by means of an adjustment screw 38 having exterior threads 40 screwed into an internally-threaded aperture 42 in the body 58 of the manifold 10. Thus, infinitesimal adjustments of the tension of the spring 36 are possible, and there is no limit to the number of settings of which the spring is capable.

The valve member 24 is preferably of at least two different diameters at longitudinally spaced apart locations therealong. Specifically, in the representative embodiment of FIG. 2, the forward tip portion 26 of the valve member 24 is of smaller diameter than the shank portion 52 of the valve member 24 where the shank portion 52 emerges from the passage 20 at the end thereof opposite the tip 26. The tip portion 26 and shank portion 52 of the valve member 24 are connected by a frustoconical portion 54.

When mold substance in the passage 20 is at a pressure greater than atmospheric pressure, a force is developed on the valve member 24, by virtue of its differential diameters. The direction of such force is opposite the direction of the force on the valve member 24 developed by the spring 36. When the pressure of the mold substance in the passage 20 is sufficiently great, the valve member 24 moves rearwardly to an open position, compressing the spring 36, whereupon the mold substance is permitted to flow through the nozzle gate 22.

The shank 52 of the valve member 24 slides snugly within an aperture 56 formed in the body 58. The body 58 thus permits longitudinal but not lateral movement of the valve member 24. If desired, sealing means (not shown) may be provided between the body 58 and the valve member 24 to prevent leakage of the mold substance in the "reverse" direction.

Heating rings 60 are provided as shown in FIGS. 1 and 2 in order to heat the mold substance to a suitable temperature for the injection molding process. The heating rings 60 are held in position, as shown in FIG. 2, by lugs 62 fastened in any suitable manner to the body portion 58 of the manifold 10 and screws 64 passed through upstanding flanges 66 formed on the heating rings 60 and threaded into the lugs 62, which are formed with interior threads complemental to the exterior threads 68 on the screws 64. In this manner, it is possible not only to heat the mold substance uniformly but also, when the occasion demands, to heat the mold substance differentially, supplying more or less heat to the mold substance at various parts of the manifold as necessary to bring the mold substance to the desired temperature at each nozzle gate 22.

The nozzle 11 shown in FIG. 2 is fabricated in one piece and inserted snugly but slidably within the bore defining the passage 20. The nozzle 11 is retained in position by a nozzle retainer 72 held by a screw 74 which is formed with exterior threads 76 and screwed into an internally-threaded bore 78 in the body portion 58 of the manifold 10.

A spring 80 urges the nozzle 11 forwardly against the nozzle retainer 72. A shim 82 may be inserted between the spring 80 and the nozzle 11 in order to secure the desired tension on the spring 80 and hence the desired biasing force on the nozzle 11.

Thus, longitudinal movement of the nozzle 11—that is, movement to and fro in the direction in which mold substance moves as it issues from the nozzle gate 22—is facilitated. In this manner, unequal lengths of the various nozzles 11 (whether due to manufacturing tolerances, differential heating, or any other cause), which would otherwise produce the result that some of the nozzles would engage corresponding depressions in the mold cavities and others would be slightly spaced apart therefrom and leak mold substance during the injection process, are compensated.

FIGS. 3A, 3B, 3C, and 3D show the operation of the structure just described in an injection molding process in accordance with the invention.

FIG. 3A shows a representative nozzle 11 of the manifold 10 in spaced-apart relation to a corresponding mold cavity 30 formed between a mold core 32 on the one hand an separable mold sections 34 and 35 on the other. Mold substance 84 fills the passage 20 (best known in FIG. 2) but is prevented from leaving the nozzle gate 22 by the valve member 24, which is in the forward or closed position and the tip 26 of which fully occupies the nozzle gate 22.

The manifold 10 is movable to and fro in the direction indicated by the double-headed arrow (though the mold could as well be movable). In order to reduce the bending moment on the manifold 10, the force urging it to the forward position shown in FIGS. 3B and 3C is preferably applied at a central position 59 (FIG. 1) of the manifold 10. FIG 3B shows the nozzle 12 inserted in a nozzle-receiving depression 86 formed about the mold gate 28 and mold substance 84 flowing through the nozzle gate 22 and the mold gate 28 and then throughout the space 30 between the mold core 32 and the separable mold sections 34 and 35. The opening or rearward movement of the valve member 24 with respect to the manifold 10 compresses the spring 36 and is effected automatically by the differential diameters of the valve member 24, the adjustment of the screw 38 being such that the valve member 24 moves to its rearward position in response to a predetermined pressure of the mold substance 84 in the chamber 20 of the manifold 10.

FIG. 3C shows the structure at the end of the injection of the mold substance 84. The pressure of the mold substance is reduced sufficiently that the spring 36 returns the valve member 24 to its forward or closed position, pushing the mold substance ahead of it to pack the mold cavity 30. In this position the tip 26 of the valve member completely fills both the nozzle gate 22 and the mold gate 28, and its forward face 88 in contact with the mold substance 84 is flush with the interior surfaces of the separable mold sections 34 and 35, thus providing a smooth and continuous surface for the mold cavity and eliminating gate marks.

FIG. 3D shows the removal of the manifold 10 from the separable mold sections 34 and 35, the tip 26 of the valve member 24 preventing leakage of mold substance through the nozzle gate 22 and also preventing the plugging of the nozzle gate 22 by hardened plastic or other mold substance between successive injections. The articles thus molded may be put to consumer use without further processing or may be subjected to further treatment in, for example, a blow stage. It is not necessary that the manifold 10 be withdrawn from the mold at the end of each injection process. In some cases, such withdrawal may be effected only, for example, at the end of an entire day's run.

FIG. 4 shows an alternate embodiment of the invention in which the nozzle 11 is formed in two portions: a nozzle tip 90 and a nozzle tip seat 92. In this embodiment of the invention, longitudinal or to-and-fro movement of the nozzle tip 90 and nozzle tip seat 92 is of course facilitated as in the embodiment of FIG. 2. Specifically, when the nozzle tip 90 is brought into contact with a mold, it is adapted to move rearwardly, forcing the valve member 24' rearwardly and slightly compressing the spring 80. (The spring 36 is also slightly compressed, for a reason to be explained.)

In the embodimnet of FIG. 4, moreover, the nozzle tip 90 is adapted for movement in a plane normal to the direction of movement of the mold substance 84 through the nozzle gate 22. To this end, the nozzle tip retainer 72 is formed with an aperture 94 larger than the external diameter of the cylindrical body portion 96 of the nozzle tip 90. The nozzle tip 90 slidably abuts the nozzle tip base 92 at a junction 98 lying in a plane.

Consequently, the embodiment of FIG. 4 is able to compensate not only for improper positioning of the nozzle 11 in the direction of movement of the mold substance 84 as it issues from the nozzle gate 22 but also for improper positioning of the nozzle 11 in directions normal thereto. Inasmuch as the nozzle tip 90 has complete freedom of movement in three mutually perpendicular directions, it is free to move a short distance in all directions, in order to compensate for irregularities due to manufacturing tolerances, differential heating, or any other cause.

In this embodiment of the invention, the tip 26' of the valve member 24' has a diameter greater than that of the nozzle gate 22, and its forward face 88' abuts the rearward-facing surface 100 of the interior of the nozzle tip 90 when the valve member 24' is in its forward or closed position. Thus the valve member 24', which is free to move axially but not in directions transverse of its axis, does not interfere with the transverse movement of the nozzle tip 90 and is moved rearwardly to compress the spring 36 in response to rearward movement of the nozzle tip 90.

FIG. 5 shows still another embodiment of the invention in which a valve member 24" is formed with a first tip 26" corresponding to the tip 26' shown in FIG. 4 and a second tip 26''' adapted to fit within the nozzle gate 22 but having a diameter less than that of the nozzle gate 22. The space between the tip 26''' and the wall of the nozzle gate 22 is equal to or greater than the space between the cylindrical portion 96 (FIG. 4) of the nozzle tip 90 and the cylindrical aperture 94 in the nozzle tip retainer 72, so that the valve member 24" does not interfere with the transverse movement of the nozzle tip 90. At the same time, the second tip 26''' occupies a portion of the nozzle gate 22 when the valve member 24" is in its forward or closed position, thus reducing the space in the nozzle gate 22 available for occupancy by the mold substance. In this way, the amount of mold substance left in the nozzle gate at the completion of the injection of the mold substance is minimized. The tip 26''' may, of course, be made sufficiently long to fit within an associated mold gate, thereby reducing the space within the mold gate available for occupancy by the mold substance when the valve member 24" moves to its forward or closed position following the injection of mold substance.

FIG. 6 shows a valve member 24''' provided with a plurality of frusto-conical portions 54' and 54". Such structure may be used where it is desired to maintain the shank 52' in the vicinity of the frusto-conical portion 54" of intermediate size while providing a sufficient differential between the largest and smallest diameters of the valve member 24''' to assure positive opening thereof in response to a predetermined mold pressure in the passage 20 of the manifold 10. The frusto-conical portions 54' and 54" facilitate relatively streamlined flow of mold substance therepast, and the shank 52' in the vicinity of the frusto-conical portion 54" provides adequate strength to the valve member.

Thus there is provided in accordance with the invention novel and highly-effective mold apparatus providing for the automatic register of mold gates with nozzle gates and eliminating dripping and plugging of nozzle gates and mold gates and further eliminating gate marks and providing for automatic control of the sequence of the injection. Many articles of similar or dissimilar size and shape can be made in a single operation.

Those skilled in the art will readily understand that the invention is susceptible of many modifications of the representative embodiments described above within the spirit and scope of the invention. For example, as a comparison of FIGS. 1, 2, and 3A–3D on the one hand with FIG. 4 on the other makes evident, the mounting of the valve member 24, 24', 24", or 24''' may be accomplished in a variety of ways with or without the boss 50. Moreover, it is possible to provide for opening of the various valve means 23 in a desired sequence, even though valve members of uniform diameter are employed, by the provision of timers or pressure-sensitive transducers and adjustable electric, hydraulic, pneumatic, or mechanical means responsive thereto for actuating the valve means. Further, while structure adapted for relative movement of the nozzle gates with respect to each other is described in detail herein, similar structure is adapted for relative movement of the mold gates with respect to each other in order to effect the desired register of the nozzle and mold gates. Likewise, the nozzles 11 need not have the domed shape illustrated in the figures but may have flat outer surfaces adapted to constitute the bottoms of the respective molds.

Accordingly, the invention is to be construed as including all the modifications thereof falling within the scope of the appended claims.

I claim:

1. In molding apparatus comprising nozzle means formed with nozzle gate means through which mold substance is discharged into a mold cavity, valve member means movable between an open position in which said valve member means is in spaced-apart relation to said nozzle gate means and permits flow of said mold substance through said nozzle gate means and a closed position in which said valve member means seals said nozzle gate means and prevents flow of said mold substance through said nozzle gate means, and manifold means for delivering mold substance to said nozzle means, the improvement wherein said valve member means is formed with a forward tip portion and a shank portion, said forward tip portion being of sufficiently small diameter to fit within said nozzle gate means when said valve member means is in said closed position, said shank portion being of larger diameter than said forward tip portion, and said forward tip portion and shank portion being connected by a frusto-conical portion for streamlined flow of mold substance therepast, said frusto-conical portion being spaced apart from said nozzle means when said valve members means is in said closed position, further comprising biasing means urging said valve member means to said closed position, said valve member means being moved to said open position in response to a predetermined pressure of said mold substance on said frusto-conical means.

2. In molding aparatus comprising a plurality of nozzle means each formed with nozzle gate means through which mold substance is discharged into a mold cavity, a plurality of independently-operable valve member means respectively associated with said nozzle gate means, each valve member means being movable between an open position in which said valve member means is in spaced-apart relation to the nozzle gate means associated therewith and permits flow of said mold substance through said nozzle gate means and a closed position in which said valve member means seals said nozzle gate means associated therewith and prevents flow of said mold substance through said nozzle gate means, and manifold means for delivering mold substance to each of said nozzle means, the improvement comprising a plurality of biasing means respectively operatively associated with said valve member means for urging said valve member means to said closed position and adjustment means respectively operatively associated with said biasing means for controlling the force exerted by said biasing means on said respective valve member means each of said valve member means being formed with at least two different diameters at longitudinally spaced apart locations therealong, whereby pressures in said manifold means above atmospheric tend to move said valve member means to said open position in a predetermined sequence depending on the setting of said adjustment means.

3. In molding apparatus comprising mold means defining a mold cavity and formed with mold gate means adapted to permit passage therethrough of a mold substance into said mold cavity, nozzle means formed with nozzle gate means adapted for register with said mold gate means, said mold substance being discharged from said nozzle means through said nozzle gate means and said mold gate means into said mold cavity, valve member means movable between an open position in which said valve member means is in spaced-apart relation to said nozzle gate means and permits flow of said mold substance through said nozzle gate means and a closed position in which said valve member means seals said nozzzle gate means and prevents flow of said mold substance through said nozzle gate means, and manifold means for delivering mold substance to said nozzle means, the improvement wherein said valve member means is formed to fit within said nozzle gate means and said mold gate means and fits within said nozzle gate means and said mold gate means when said valve member means is in said closed position, reducing the space within said nozzle gate means and said mold gate means available for occupancy by said mold substance, said valve member means being (a) formed complementally to said nozzle gate means and said mold gate means, substantially eliminating the space within said nozzle gate means and said mold gate means available for occupancy by said mold substance when said valve member means is in said closed position, and (b) protruding beyond said nozzle gate means a distance equal to the depth of said mold gate means.

4. In molding apparatus comprising mold means defining a plurality of mold cavities, sai dmold cavities being formed with a plurality of mold gate means respectively associated therewith and adapted to permit passage therethrough of a mold substance into said mold cavities, a plurality of nozzle means each formed with nozzle gate means respectively associated with said plurality of mold gate means, said mold substance being discharged from said nozzle means through said nozzle gate means and said mold gate means into said mold cavities, a plurality of valve member means respectively associated with said nozzle gate means, each valve member means being movable between an open position in which said valve member means is in spaced-apart relation to the nozzle gate means associated therewith and permits flow of said mold substance through said nozzle gate means and a closed position in which said valve member means seals said nozzle gate means associated therewith and prevents flow of said mold substance through said nozzle gate means, and manifold means for delivering mold substance to each of said nozzle means, the improvement comprising means operatively associated with the gate means of at least one of said two pluralities of gate means for facilitating relative movement of the gate means of said one plurality of gate means with respect to each other, whereby register of the gate means of said one plurality of gate means with the gate means of the other of said two pluralities of gate means is facilitated.

5. Apparatus as set forth in claim 4 wherein each of said plurality of nozzle means is formed in two parts, one of said parts being movable with respect to the other of said parts.

6. Apparatus as set forth in claim 5 in which each of said movable parts is mounted for movement to and fro along the axis of movement of said mold substance through said nozzle gate means.

7. Apparatus as set forth in claim 6 in which each of said movable parts is mounted for movement in a plane normal to the axis of movement of said mold substance through said nozzle gate means.

8. In molding apparatus comprising mold means defining a plurality of mold cavities, said mold cavities being formed with a plurality of mold gate means respectively associated therewith and adapted to permit passage therethrough of a mold substance into said mold cavities, a plurality of nozzle means each formed with nozzle gate means respectively associated with said plurality of mold gate means, said mold substance being discharged from said nozzle means through said nozzle gate means and said mold gate means into said mold cavities, each of said plurality of nozzle means being formed in two parts, a plurality of valve member means respectively associated with said nozzle gate means, each valve member means being movable between an open position in which said valve member means is in spaced-apart relation to the nozzle gate means associated therewith and permits flow of said mold substance through said nozzle gate means and a closed position in which said valve member means seals said nozzle gate means associated therewith and prevents flow of said mold substance through said nozzle gate means, and manifold means for delivering mold substance to each of said nozzle means, the improvement wherein each of said nozzle means is formed in two parts, one of said parts including said nozzle gate means and being movable in all direction with respect to the other of said parts, whereby register of said nozzle gate means with said respective mold gate means is facilitated, each of said valve member means being formed with a forward tip portion of a size to fit within the nozzle gate means and mold gate means respectively associated therewith and fitting within said nozzle gate means and mold gate means when said valve member means is in said closed position, substantially eliminating the space within said nozzle gate means and said mold gate means available for occupancy by said mold substance, each of said valve member means being formed with at least two different diameters at longitudinally spaced apart locations therealong, whereby pressures in said manifold means above atmospheric tend to move said valve member means to said open position, and further comprising a plurality of adjustable spring means operatively associated with said respective valve member means and biasing said valve member means towards the closed position, whereby said valve member means open in a predetermined sequence in response to predetermined pressures of said mold substance.

References Cited

UNITED STATES PATENTS

| 2,668,325 | 2/1954 | Goodwin. |
| 2,953,815 | 9/1960 | Mainardi. |
| 3,023,458 | 3/1960 | Seymour. |

FOREIGN PATENTS

| 1,274,579 | 9/1961 | France. |

J. SPENCER OVERHOLSER, Primary Examiner

W. L. McBAY, Assistant Examiner